Jan. 6, 1970  K. J. CAPLAN  3,487,609
METHOD AND APPARATUS FOR FILTERING A GASEOUS MEDIUM
Filed Feb. 29, 1968  3 Sheets-Sheet 1
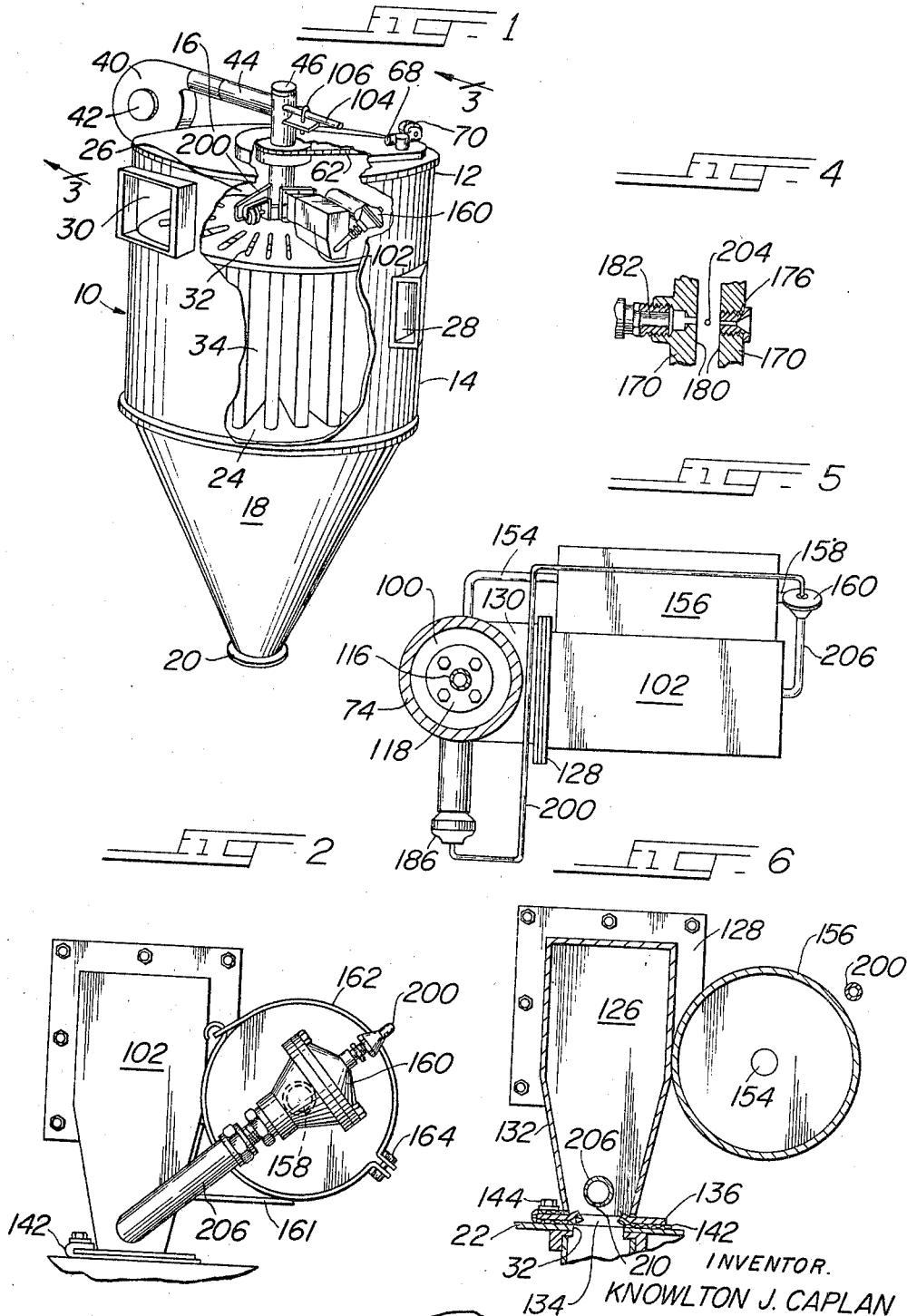
INVENTOR.
KNOWLTON J. CAPLAN
BY Rummler & Snow
ATTYS

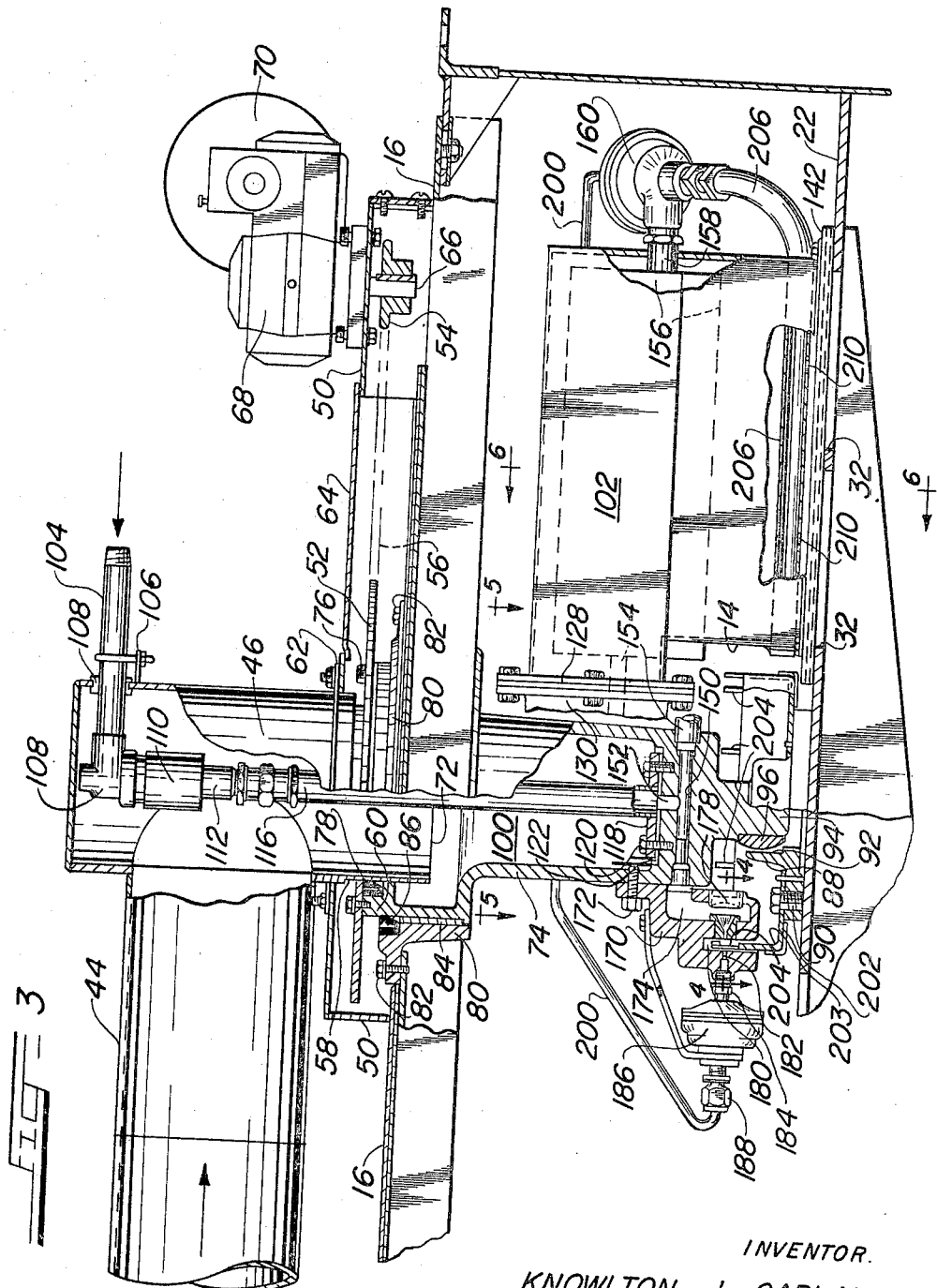

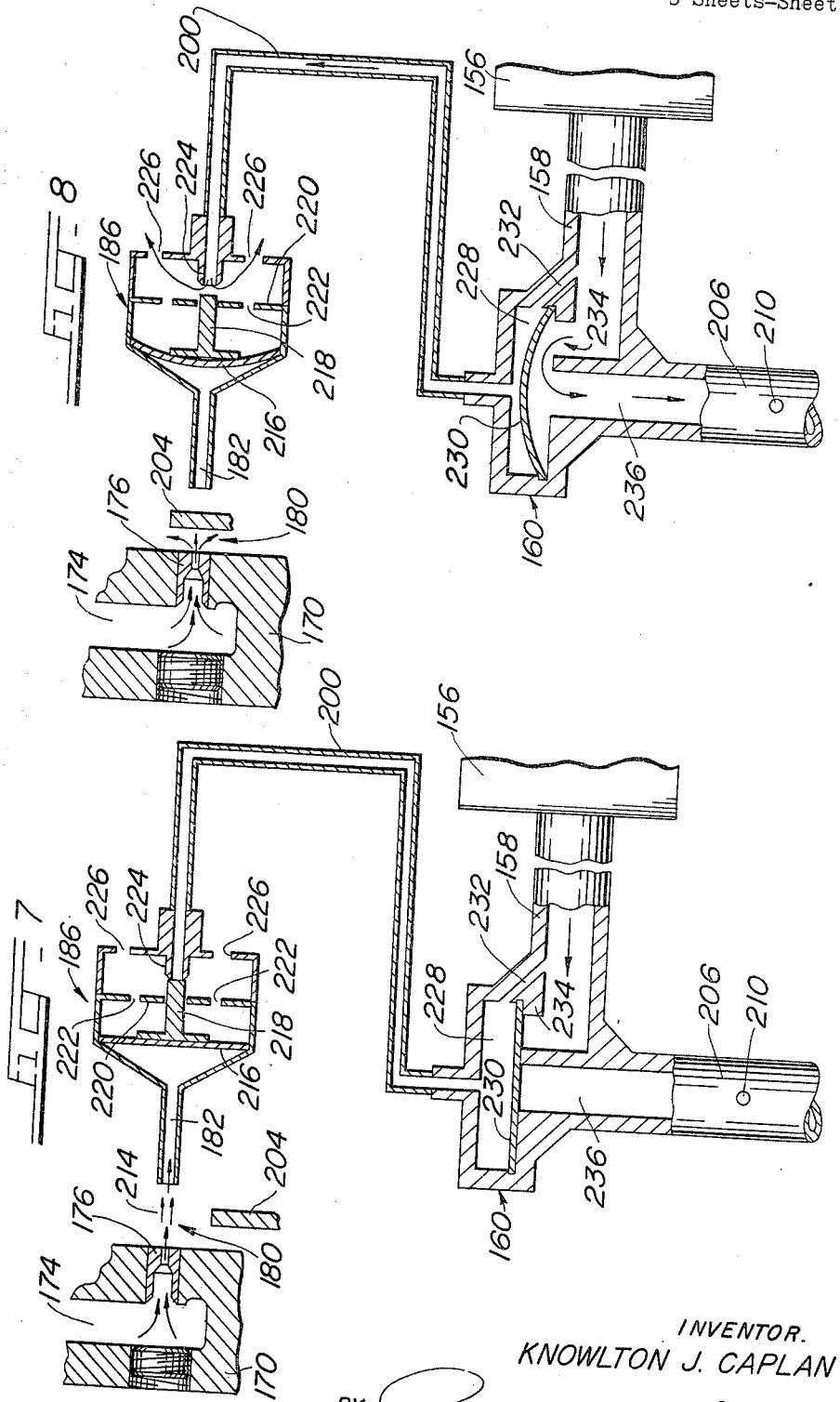

3,487,609
METHOD AND APPARATUS FOR FILTERING A GASEOUS MEDIUM
Knowlton J. Caplan, Minneapolis, Minn., assignor to Hart-Carter Company, Chicago, Ill., a corporation of Delaware
Continuation-in-part of application Ser. No. 572,295, Aug. 15, 1966. This application Feb. 29, 1968, Ser. No. 715,460
Int. Cl. B01d 46/08
U.S. Cl. 55—96           4 Claims

ABSTRACT OF THE DISCLOSURE

A dry filter for removing solid particles from a gaseous medium wherein a series of flexible filter bags are cleaned intermittently, successively and in situ, by means adapted to deliver a positive pressure reverse flow of clean gas into the clean gas outlet of each filter bag and to produce, during the period of reverse flow, a shock wave traveling from end to end of the filter bag.

CROSS REFERENCE TO RELATED APPLICATION

This application is a continuation-in-part of my copending application, Ser. No. 572,295, filed Aug. 15, 1966, now abandoned.

BACKGROUND OF THE INVENTION

The equipment for removing dust or particulate matter from gases or air may consist of washers or scrubbers, dry filters, cyclonic or mechanical separators, or electric precipitators. The gases may be air from exhaust ventilation systems providing dust control, from the discharge of pneumatic conveying systems, or air or gases containing dust or fumes from industrial processes. In many types of such installations dry filtration is preferable to the other methods since it provides higher collection efficiencies and the dust or other material is recovered in a dry state. There are many types of filters in common use; some of them require the filter elements to be removed from the system and separately cleaned, or replaced by new elements, while others provide various means for cleaning the filter element in place in order to keep the flow resistance of the filter at a reasonable value.

The desiderata for all types of filters are well known. They should be efficient in dirt removal and interpose low resistance to air flow. Moreover, they should possess large dust holding capacity and should be easy to clean and handle. While many of the dry filters commonly found in the prior art possess some of these requirements, nevertheless, they all contain inherent shortcomings because of their structural features, functional design and the manner in which the filters are cleaned.

This invention is concerned with a new and improved method and means for a dry type air or gas filter wherein the effectiveness and performance of the filter is greatly increased while maintaining the previously known high degree of dust collection efficiency and somewhat increasing it, and is in the nature of an improvement over the disclosure of United States Letters Patent 2,974,748.

Accordingly, it is a primary object of the present invention to provide an improved method and means for increasing the capacity and efficiency of dry filters employing a flexible filter medium and a reverse flow or back-washing system for cleaning the filters.

Other objects of this invention are to provide in an air filter of the type using a reverse flow of air under pressure for cleaning or flushing the filter element, novel means for causing a single shock wave to pass through the filter element at the beginning of, or during the reverse flow of cleaning or back-washing air therethrough; to provide in an air filter new and improved means for increasing the efficiency of the filter-cleaning operations by producing a single shock wave in the vicinity of a filter element as an adjunct or auxiliary to the reverse-flow filter cleaning step; and to provide in an air filter having means for introducing serially a reversed cleaning flow of air under pressure to each of a plurality of filter elements contained therein, the combination therewith of novel means for introducing a single shock wave into each filter element, one after the other, whereby the efficiency of cleaning of the filter element, by the concomitant reverse air flow, is increased and the filtering action of the air filter as a whole is surprisingly more effective.

SUMMARY OF THE INVENTION

In accordance with this invention the discovery has been made that the use of a single shock wave passing through a filter element concomitant with a reverse flow filter cleaning step maintains a reasonable filter resistance under conditions where the use of reverse flow cleaning alone cannot maintain filtering operations to any practical degree, maintains a much lower filter resistance or conversely a much higher filter ratio under conditions where reverse flow alone will maintain filtering operations, and maintains a reasonable filter resistance under conditions where the shock wave alone cannot maintain that result. The single shock wave used in accordance with this invention is not the primary means for cleaning the filter although it may remove some caked filter dust; rather the shock wave has been found to increase the efficiency of the concomitant reverse flow filter cleaning step by 40% or more.

The term "shock wave," as used in the present specification and claims, means an abrupt high pressure front originating from the sudden release of a relatively large amount of energy in a limited space, which travels through the surrounding gas medium at a velocity greater than the speed of sound in the medium, producing local heating, expansion, and then rarefaction as the wave passes. The maximum pressure or peak pressure in the shock wave is very large compared to the pressure in sound waves, so large and so rapid as to cause extremely rapid changes in the thermodynamic state of the medium and amounts to a mathematical discontinuity in the pressure, temperature and velocity of the gas. The shock wave does not have a wavelength, and the thickness of the high pressure front is very small, effectively zero thickness, as compared to other pressure phenomena in gases such as incompressible flow or sound.

"Filter resistance" is the resistance of the filter medium and dust cake to the flow of gas, measured by the difference in pressure from the upstream to downstream sides of the filter medium, expressed in inches water gage (w.g.).

"Filter ratio" is the flow rate of filtering gas, cubic feet per minute (c.f.m.) per square foot of filtering medium, expressed as "cubic feet per minute per square foot," abbreviated "c.f.m. per sq. ft."

This invention can be carried out using any apparatus, such as described in Patent 2,974,748, which employs a reverse flow of gas to clean a hollow, or bag-type, air permeable filter element to remove solid particles from a gaseous medium, by employing the step of transmitting a single shock wave to the filter element concomitant with the reverse flow flushing operation; or by incorporating means therein, such as a pilot-operated compressed gas valve, electrically operated solenoid valves or air-switching means, wherein the compressed gas pressures are sufficiently high above 15 pounds per square inch gage pressure, and the valve opens to the full open position with sufficient rapidity, to create a shock wave which can be passed along the filter element wall.

DESCRIPTION OF THE DRAWING

FIG. 1 is a perspective view of an air filter with a portion of the side wall cut away to reveal the interior parts.

FIG. 2 is an end view of the filter cleaning means and one form of means to produce a shock wave.

FIG. 3 is a partial sectional view taken along lines 3—3 of FIG. 1, with the plenum broken away and rotated 90° counterclockwise.

FIG. 4 is a partial view in cross-section to show the details of one form of means for producing a shock wave.

FIG. 5 is a top plan view of the apparatus.

FIG. 6 is a cross-sectional view taken along lines 6—6 of FIG. 3.

FIG. 7 is a diagrammatic sectional view of a means for generating a shock wave, same being shown in closed position.

FIG. 8 is a diagrammatic sectional view of the means shown in FIG. 7 in open position.

DESCRIPTION OF THE PREFERRED EMBODIMENTS

In order to demonstrate this invention, a number of experiments were conducted using the apparatus generally shown in FIG. 1 modified so as to produce the shock wave by means of a cam actuated pilot valve attached to the outer end of the plenum to control a main valve for releasing a sudden burst of compressed air, at a pressure of about 80 pounds per square inch gage and a duration of about 0.15 second, into the outlet end of the filter bag during the reverse flow flushing cycle. The tests were conducted using a very finely grained limestone dust, of the type similar to that specified by the A.S.M.E. Power Test Code 28 for a standard calibration dust for particle size determinations, and a relatively difficult dust to filter in that it has low permeability and relatively high filtering resistance at modest filter ratios.

The filtering apparatus was used at a filter ratio of about 6.0 c.f.m. per sq. ft. and a dust load of 16 grains dust per minute per square foot of filter medium. The filter resistance remained constant at 3.9 inches water gage, using back-washing air delivered at a rate of 210 cubic feet per minute and at a pressure of ½ pound per square inch to clean each of twelve filter bags with a cleaning time of about 0.6 second.

This unit was next operated with the compressed air shock wave generator shut off but otherwise with the same conditions as before stated. The filter resistance immediately began to rise and reached 14 inches water gage in four hours and was still rising when the experiment was terminated, thus showing the inability to maintain filtering operations.

The filter ratio was then reduced to a level where the reverse air flow filter cleaning steps without shock wave could maintain the filter resistance as a constant value. This resulted in a filter resistance of 4.5 inches water gage at a filter ratio of 4.4 c.f.m. per square foot. The use of the single shock wave was commenced again and within one hour the filter resistance had decreased to 2.5 inches water gage and was maintained at that level for 18 hours. At the end of this time the reverse air flow filter cleaning step was omitted and the unit was operated using the single shock wave alone to clean the filter element. Under these conditions the filter pressure began to rise immediately and in four hours had increased to 10 inches water gage and was still rising, thus showing the inability to maintain filtering operations. These results are summarized in the following table:

AIR FILTER EXPERIMENTS WITH AND WITHOUT SINGLE SHOCK WAVE DURING REVERSE FLOW CLEANING STEPS

| Experiment No. | Filter Ratio (c.f.m./sq. ft.) | Type of filter cleaning | Filter resistance, inches water gage |
|---|---|---|---|
| 1 | 6.0 | Single shock wave with reverse air flow. | 3.9 |
| 2 | 6.0 | Reverse air flow alone | [1] >14 |
| 3 | 4.4 | do | 4.5 |
| 4 | 4.4 | Single shock wave with reverse air flow. | 2.5 |
| 5 | 4.4 | Single shock wave alone | [1] >10.0 |

[1] In 4 hours.

Because the apparatus was operated continuously the foregoing results represent a plurality of experiments under dynamic conditions and are to be so interpreted. In filters of this type it is highly desirable to maintain a filter resistance of about 2 to 5 inches water gage throughout the operating periods. The foregoing results show that this filter resistance level cannot be maintained by the use of reverse air flow flushing alone, unless the filter ratio is reduced to below 5.0. Experiment No. 1 shows that the combination of reverse air flow and a single shock wave maintains a reasonable filter resistance under conditions (filter ratios) where reverse air flow alone cannot maintain economic operation. Compare for example Experiments 1 and 2. Reference to Experiments 3 and 4 shows that under conditions below a filter ratio of about 5.0, where the reverse air flow can maintain operation, the combined use of a single shock wave and reverse air flow maintains a much lower filter resistance or, conversely, a higher filter ratio. The last experiment shows that under conditions wherein reverse air flow cleaning can maintain operation, the use of a single shock wave alone is ineffective and inoperative.

Another series of experiments, No. 6, was conducted under quite similar operating conditions as the first series. In this set, the same dust was used at a somewhat higher rate, 20 grains per minute per square foot; and the filter ratio was somewhat higher, 6.4 c.f.m. per sq. ft. However, the machine was provided with a shock wave generating system shown in FIGURES 1–6 and described in detail subsequently; and the flow rate of back-washing air was delivered at a rate of 105 cubic feet per minute and a pressure of ¼ pound per square inch, one-half the values used in experiments numbered 1 through 4. This resulted in a filter resistance of 3.8 inches water gage, essentially the same value as was obtained in Experiment No. 1, but using one-half the previous amount and pressure of back-washing air. The comparison of Experiments 1 and 6 shows that the cleaning action obtained by generating a shock wave during back-washing does not yield a simple additive or expected result, because if it did, the filter resistance in Experiment 1 would be expected to be lower than in Experiment 6.

In the experimental apparatus, it is possible to vary and control the rate of flow of filtering air and therefore the filter ratio; and the dust load; and by varying these parameters, different resulting filter resistances are obtained. It was observed during such experiments that a general relationship exists which can be stated as follows: The necessary and minimum flow rate of back-wash air is that which provides a slight but definite net reverse flow through the filter medium; and the necessary and minimum pressure of back-wash air is that which is barely sufficient to inflate the filter medium tube. When these conditions are achieved, the shock wave dislodges the dust particles from the fibers of the filter medium and from each other, and the back-wash air removes the dislodged particles from the surface of the filter medium. Further increases in back-wash flow rate or pressure do not provide any benefit. This is an unexpected result, because in back-washing of filters, the expected result is that the more vigorous the back-wash action, the more effective is the cleaning action.

In practical application, the flow rate and pressure of the back-wash air would be slightly greater than the expected or designed maximum filter ratio and maximum filter resistance, so that the numerical values of these parameters would be established as a matter of practical design; the basic criteria is as stated above.

Low filter pressures and high filter ratios are required for economical operation of any large scale filter devices. In accordance with this invention the combined use of a single shock wave and reverse air flow accomplishes these results, where either alone is ineffective. Further, the combination yields a result that is unexpected both quantitatively and in general principle.

One form of apparatus that can be used to carry out the instant invention is illustrated in U.S. Patent 2,974,748, provided same is equipped with means to transmit a single shock wave through the filter elements therein at predetermined times during the cycles of operation. Accordingly, the instant description of FIGS. 1 and 3, which are partially diagrammatic and omit or show only in a general way certain parts that are more completely described in said patent, will be confined to the essential parts or elements and details of construction of the entire apparatus and their functions can be had by reference to said patent.

The apparatus is illustrated by a generally cylindrical casing 10 comprising upper and lower cylindrical casing portions 12 and 14, respectively, a top wall element 16 and a frustro-conical hopper-like bottom section 18, the lower end 20 of which opens into a rotary feed-valve air lock, not shown, which leads to a suitable dust bin. The supporting framework and certain auxiliary equipment, such as side access plates, controls and the like are omitted from FIGS. 1 and 3.

A horizontally disposed partition or tube sheet 22 divides the casing portions and defines the separating or filter chamber 24 and the overlying filtered air chamber 26. The air inlet passage 28 of the apparatus communicates tangentially with the interior of the filter chamber 24, while the filtered air outlet 30 communicates with filtered air chamber 26. The air inlet passage 28 is adapted to be connected to a source of air or other gases containing or laden with the solid particles to be removed.

The tube sheet or transverse partition 22 is perforated to provide a plurality of circumferentially spaced pairs of outlet passages 32 which communicate between the separating chamber 24 and the filtered air chamber 26. An elongated filter element 34 is suitably mounted, by means not shown, to the under side of the partition 22 in register with each passage 32. In the form shown, each filter element comprises a tubular bag of pliant fabric, preferably felted, suitably supported internally to retain a hollow generally flat-sided configuration, the said support means being adapted to enclose and support the bottoms of the filter bags which extend substantially to the top of the hopper section 18.

The top of each filter bag or element 34 opens, through the respective passageways 32, into the filtered air chamber 26 and each bag is supported vertically by a centrally located hangar rod (not illustrated) having radially extending supports at the bag bottom.

Conventional means such as a blower connected to inlet 28 or a suction fan connected to outlet 30 may be used to introduce the dust laden air into the filter chamber 24. As the dust laden air moves circumferentially within the chamber 24, it passes through the porous walls of the filter elements and then upwardly through the outlet passages 32 into clean air chamber 26 to exit via discharge outlet 30.

The filter elements 34 are so constructed as to allow the free passage of air or other gases therethrough while retaining the solid particles as a deposit on the outer surface thereof or within the insterstices of the walls of the filter elements. To prevent the filter elements 34 from becoming choked and clogged with the dust particles and to maintain a high level of filtering efficiency, it is necessary to apply some method of periodic cleaning and removal of the dust from the filter elements. There are three generally used methods to accomplish these purposes, namely, the use of air pulsations, back-washing, and reverse-jetting. The reverse-jet method which uses a blow-ring circumferentially engaging the filter medium and traveling up and down the length of the filter column, has the major disadvantage of requiring a strong and flexible filter material to withstand the force of the 2 to 3 p.s.i.g. jet air, and the rubbing action of the blow-ring results in a relatively short life for the filter elements. When used at normal or typical filter resistance of 4 to 6 inches water gage, the back-washing method is satisfactory but is ineffective if the filter resistance exceeds about 8 inches water gage. The air pulse method, however, is capable of operating at very high filter resistance, though with greatly reduced filter ratios.

The back-washing method illustrated by U.S. Patent 2,974,748 uses clean air at 15 to 22 inches water gage (0.5 to 0.8 p.s.i.g.) conducted to the open end of each filter element by a rotating or angularly moving air plenum. The air plenum may be provided with a quick-opening valve or damper which on opening creates a gentle pulse of air which "snaps" the filter material and aids in removal of dust deposits. A modification of this method employs a moving air nozzle in place of the plenum to avoid the necessity of some kind of seal at the discharge opening of the plenum. The moving air nozzle, having no seal for engaging the tube sheet, provides a less positive flow of back-wash air and can tolerate filter ratios of only one-fourth to one-third that accommodated by the movable plenum-with-damper type. However, one disadvantage is that the filter resistance must be kept at reasonably low values, viz 6 to 8 inches water gage maximum. If the dust load or the filter ratio is so high that the filter resistance exceeds this value, the back-wash method (at 15 to 22 inches water gage pressure) becomes ineffective in keeping the filters clean. Under these conditions continued operation of the apparatus becomes impossible and the filter resistance gradually rises until the apparatus is ineffective.

As has been demonstrated herein the instant invention secures the advantages and eliminates the disadvantages of these prior methods by the use of the combination of a single peak or crest shock-wave and a positive pressure back-wash flow to maintain filter cleanliness and high capacity of filtration.

As shown in FIG. 1 an apparatus for providing the back-wash flow comprises an air blower 40, operated by a motor 42, the outlet of which connects to the conduit 44, extending radially across the top member 16 and connecting with a fixed vertical conduit 46 (refer to FIG. 3) which extends through a housing 50, enclosing drive gears 52 and 54 and drive chain 56. The conduit 46 has a reduced section 58 in sealed running relationship with a rotatable collar 60 and is attached and sealed to the housing 50 by suitable means such as the flange 62. A removable inspection plate 64 is provided in housing 50 for access to gear 52, drive chain 56 and drive pinion 54, in the usual manner. The drive pinion 54 is connected to the shaft 66 of a reduction gear 68, driven by the motor 70.

The stationary conduit 46 extends through the driven gear 52 and the bottom end, indicated at 72, communicates with the hollow lower trunk 74 of the collar 60. The driven gear 52 is attached to collar 60 by means of studs 76 and a circular air seal 78 is provided within an annular recess between the rotable collar 60 and the outer surface of the reduced section 58 of the conduit 46. As shown the inner periphery of the gear 52 overhangs and serves as a retainer for the seal 78.

The top member 16 carries combination seal and bearing member on mounting ring 80, secured thereto by means of lugs 82. A sleeve bearing 84 is mounted between collar 60 and mounting ring 80 to provide a bearing surface for the rotatable element and the top of the ring 80 has a recess in its internal surface for holding an annular air seal 86 above the top end of the sleeve bearing 84.

In the construction shown, the partition 22 carries, by means of lugs 90, a cup-shaped thrust bearing 88 having a central recess 92 into which the solid end 94 of the trunk 74 is rotatably supported by means of a Neoprene or Nylon bearing 96. The shaft end 94 is made an integral part of the trunk 74, and the hollow interior 100 of the trunk 74, provides communication between the conduit 46 and the traveling manifold or plenum 102, shown in FIG. 3 at a position rotated 90° counter-clockwise from its normal position for convenience of illustration. The true relationship of these elements is as shown schematically in FIG. 5.

A high pressure air conduit 104, supported by a bracket 106, passes through a grommet 108 in the wall of the conduit 46 and into communication with an elbow 108 connected to a rotary sealing means 110 mounted on a nipple 112 leading to a conduit 116 which is affixed to the bottom of the hollow trunk 74, by means of a flange 118 and lugs 120. A suitable seal of Neoprene or rubber, as indicated at 122, is provided around this juncture.

From the foregoing description, it is apparent that the conduits 44, 46 and 104 are stationary, while trunk 74 and conduit 116 are free to rotate upon the bearings 84 and 96, upon being driven by the motor 70 through the drive gear 54, chain 56 and gear 52; and that at the same time low-pressure back-wash air can pass from the blower 40, through conduits 44–46, into the plenum 102. Simultaneously high pressure gas can be supplied continuously to the rotating conduit 116 through the stationary conduit 104.

Referring to FIGS. 5 and 6, the rotatable plenum 102 is seen to have a hollow interior 126 and to be attached to the trunk 74 by means of bolted flange 128 and an elbow 130 integral on the trunk 74. The plenum 102 has an inwardly tapering lower section 132 terminating in a longitudinal aperture 134 defined by a flange 136 carried by the plenum structure. As shown the bottom surface of the flange 136 is spaced slightly from the top surface of the partition or tube sheet 22 to accommodate a felt or canvas seal member 142 which slides on the partition to seal the plenum thereagainst. The seal 142 is affixed to the flange 136 and has an opening corresponding to the plenum aperture 134. Any suitable means for attaching the flange and seal to the bottom of the plenum can be used, such as the bolt 144 on the leading portion of the flange.

Referring again to FIG. 3, it will be seen that the bottom of the trunk 74 has a transverse bore 150 extending therethrough and a vertical bore 152 which connects the open bottom end of conduit 116 with the bore 150. A conduit 154 is connected at one end of the bore 150 and leads to a surge tank 156 (located behind the plenum 102 as shown in FIGS. 5 and 6) and to a flow control valve 160. The control valve 160 may be of any suitable kind for rapid releasing and stopping the flow of a high pressure gas. As shown in FIG. 2, the surge tank 156 is mounted on the side of the plenum 102 by a bracket 161 and a split-ring clamp 162 held by the bolt 164.

The other open end of the bore 150 (FIG. 3) is in communication with a control housing 170 which is in the form of a casting affixed to the side of the rotatable trunk 74 by means of one or more studs 172. The casting of the control housing 170 has an inverted L-shaped internal passageway 174 in open communication at one end with the bore 150. A jet nozzle 176, as shown in FIG. 4, is mounted in a threaded aperture in the outward side of the passage 174 and the opposite wall of the passage is provided with an opening normally closed by a threaded plug 178. The plug 178 is removable for access to the jet nozzle and for purposes of assembly, inspection and replacement of the same.

The control housing 170 has a vertical, downwardly opening slot 180 extending upwardly from its base and curving horizontally along an annular arc centered at the rotational center of the trunk 74. The jet nozzle opens into this slot 180 and a receiver 182, formed by an opening in the outer wall of the casting 170, diametrically opposite the nozzle 176, communicates through a coupling 184 with the inlet side of a pilot valve 186, which through the union 188 and conduit 200 connects with main control valve 160. Any suitable type of pilot valve may be used which is adapted to trigger a sudden release of relatively high pressure gas from the main control valve 160.

The base of the step bearing 88 carries an annular cuplike plate 202, having a vertical wall 203 extending into the housing slot 180 and from which extend a plurality of circumferentially spaced vertical rods 204. These rods functions as "interrupters" and are disposed to cross between the orifice of the jet nozzle 176 and the receiver opening 182 for actuating the pilot valve 186, as will be hereafter described.

These rods or "interrupters" 204 are stationary and are uniformly spaced around the center of rotation of the trunk 74 at the same radial distance therefrom so as to cross the jet stream from the nozzle 176 as the housing member 170 rotates with the trunk 74. One interrupter 204 is provided for each filter element 34, or for each filter outlet 32 in the tube plate or partition 22. All of the interrupters 204 are circumferentially spaced on the vertical wall of plate 202 so that each time the plenum 102 reaches one of the said tube plate outlets to deliver a back-wash filter cleaning flow of air into the respective filter element, an interrupter rod is momentarily disposed within the path of the jet issuing from the nozzle 176 toward the receiver opening 182.

As shown in FIGS. 2, 3 and 6, the outlet conduit 206 from the control valve 160, at the end of the plenum, extends horizontally into the bottom of the plenum, just above the opening 134 in the flange 136. This conduit has a pair of orifices 210 spaced apart along the bottom thereof and directed downwardly into the opening 134 in the flange 136.

FIGS. 7 and 8 illustrate diagrammatically the operation of the means shown in FIGS. 1–6 inclusive for controlling the high speed operation of the valve 160 which delivers high pressure gas or air to the conduit 206 for creating a shock wave in each filter as the back-wash air plenum 102 comes into registry therewith. In these diagrams those parts corresponding to the parts shown in FIGS. 1–6 are similarly numbered.

As before mentioned, the passageway 174 in the control housing 170 conducts air supplied at a pressure of from 60 to 100 p.s.i.g. to the jet nozzle 176 to form a jet stream, indicated by the arrows 214, directed across the slot 180 into the receiver is about 1–2 p.s.i.g., which is exerted against the low pressure side of the diaphragm 216 of the pilot valve 186. A plunger-valve member 218 is attached to the diaphragm 216 and is slidably mounted in the transverse wall 220, having apertures 222 therethrough. As shown, the end of the plunger 218 seats against the outlet end 224 of the bleed line 200. Air escape orifices 226 are provided in the pilot valve body on the plunger side of the diaphragm 216.

The bleed line 200 leads from the pressure chamber 228 of the control valve 160, on the upstream side of the diaphragm 230, which is connected to the high pressure line 158 from the surge tank 156 by means of a by-pass 232. The diaphragm 230 controls the flow of high pressure air from the conduit 158, through the inlet 234 to the conduit 206, leading to orifices 210 of the shock wave generator (see FIG. 3) at the bottom of the plenum 102.

The operation of this control means is as follows: As long as the air flow across the ambient gap or slot 180 of the control system is undisturbed, the jet stream 214 from the nozzle 176 transmits a pressure to the low pressure side of the diaphragm 216. Since this pressure is acting over a large area, the plunger 218 of relatively much smaller area is forced against the seat 224. As a result the bleed line 200 is held closed even though the static pressure therein is substantially the same as the line pressure of the conduit 158. The high pressure in the pressure chamber 228, supplied by the by-pass 232, thus holds the main control diaphragm 230 in a closed position against the valve outlet 236 leading to the line 206, and against the inlet 234, as shown in FIG. 7.

When an interference element or interrupter 204 intercepts or passes through the jet stream 214 in the ambient gap 180, as shown in FIG. 8, the normal air flow into the receiver is blocked, momentarily relieving the holding force on the low pressure side of the diaphragm 216, and permitting the plunger 218 to be unseated by the pressure in the bleed line 200 leading from the control valve pressure chamber 228. This allows the pressure in the chamber 228 to be released through openings 226 of the pilot valve 186 and the diaphragm 230 is suddenly flexed (for a fraction of a second) to open communication between the ports 234 and 236 and allow the sudden passage of high pressure air from line 158 under the impetus of the large volume of the surge tank 156, into the line 206. This suden discharge of high pressure gas from orifices 210 in the wall of the conduit 206 creates a shock wave which travels at super sonic speed away from the orifices 210 in the axial direction thereof. Any flow of compressed air following the generation of the shock wave is incidental to the process, and is minimized to reduce wastage of compressed air by closing the valve as rapidly as practical. When the interrupter 204 is removed these operations are reversed and the jet force 214 seats the plunger 218 on the bleed outlet 204, causing the high pressure from the line 158, through the by-pass 232, to reseat the diaphragm 230 and cut off the pressure flow from the valve 160 through the outlet 236, the parts returning to the condition of FIG. 7.

This operation of the control system is extremely rapid and the opening and closing movement of the diaphragm 230 occurs between the entry of the interrupter 204 into the jet stream 214 and the exit of the interrupter therefrom. Thus the duration of high pressure gas flow from the valve 160 into the conduit 206 is determined by the size of the interrupter element and its speed of movement across the jet stream.

In a preferred embodiment of this control system the nozzle 176 is 0.030" in diameter, the gas pressure at the jet nozzle 176 is about 10 to 15 p.s.i.g. and the ambient gap 180 is 0.375". The receiver 182 has an inside diameter of about 0.100" and the inlet pressure is about 80 p.s.i.g. in the line 150. The interrupter 204 is a rod or peg having a diameter of 0.0315" and the radial distance from the center of rotation of the trunk 74 to the row of interrupters on the flange 202 is 4.5 inches. The turning speed of the control housing 170 and the plenum 102, governed by the reduction gear 68, is 1 r.p.m. This relationship of part sizes and rotational speed delivers a single shock wave into each filter element with an "on time" of 0.15 second; and each filter element is flushed once each minute. Preferably, the release of the shock wave is timed to occur where the filter bag reaches the taut condition of its distention.

The invention has several advantages and differences over the prior art. None of the working parts are subjected to the abrasive action of the dust laden gases; cam and cam-follower mechanisms are eliminated; and there is no necessity for using high capacity blowers or extreme pressure differentials within the filtering apparatus to secure optimum results.

Because of the increased cleaning efficiency, resulting from the shock wave in combination with the back-wash, there can be a material reduction in the pressure and volume of reverse flow air required from the blower 42 for a given filter capacity of clean air as compared with conventional filters. Also the cleaning or back-wash gas can be ambient air or the inlet for the blower 42 can be within the clean air chamber 26.

Any number of filter elements can be used with my improved method of filter operation and the said elements may be arranged in a straight line or circular configuration as desired. Two or more filter units 10 can be operated in parallel or in series relationship as desired and the filter elements may be of various cross-sectional shapes. By rotating the plenum 102 at a speed of one revolution per minute, and providing twelve filter elements uniformly spaced angularly in the separating chamber, the cleaning time for each filter in the test apparatus was approximately one second. The shock wave was timed for delivery when the plenum was substantially centered over the outlet of each filter.

There is no loss of the cleaning air and no necessity for interrupting its flow from the blower 42 while the apparatus is in operation regardless of the filter spacing; and if desired, the filter apparatus may be designed so that, with a constant flow of air through conduits 44 and 46 into the plenum taking place, the opening 134 will be closing on one passageway 32 as the other side is opening or just about to open over the next adjacent passageway 32.

The method of this invention can be conducted in any type or size of apparatus ranging from laboratory scale to the commercial type illustrated. Any gas containing suspended solid particles susceptible to mechanical filtering can be treated in accordance with this invention. The method is carried out by passing the particle laden gas through one or more filter elements in succession or in parallel, intermittently passing a reverse flow of a cleaning gas through the filter elements at a pressure sufficiently above the normal gas flow to cause a flushing action to wash away dust particles trapped by the filter, and simultaneously transmitting a single shock wave through the filter element in the direction of the reverse flow gas. Using a cleaning time of one second as illustrative, the shock wave can be transmitted through the filter element at any point in the one second time lapse. The mid-point delivery of the shock wave, however, is preferred.

Shock waves are reflected from surfaces just as other pressure waves or sound waves. The smoother and the more rigid the surface, the greater is the degree of reflection; conversely in open space there is no reflection. The filter bag, with its coating of dust, represents a surface somewhere in between a dense, rigid wall and empty space. As the rotating air trunk, or plenum, introduces reverse flow air into each filter pocket, it blows up, or distends, the pocket until the fabric and its dust layer are taut. If the shock wave is introduced at this time (during the reverse flow, or flushing cycle, when the surface is taut), the surface represents a better reflector for the shock wave than would be the limp filter bag in the state in which it exists just prior to the reverse-flow-flushing operation. Thus, the improved results of the present invention are believed to be at least partly due to the fact that the shock wave is introduced when the filter element is in such a state that it presents the maximum practical reflection ability for the shock wave, thereby making the shock wave more effective. In testing this shock wave effect in filter elements up to 8 feet long, as compared with filter elements 26 inches long, used in the laboratory prototype of the improved filter, it was found that the relative effect on the filtering pressure in the 8 foot long bag, was almost identical with that obtained in the 26 inch long bag of the prototype, thus indicating quite effective reflection of the shock wave as it travels from top to bottom of the filter bag.

It has been found that the dust collection, or dust removal, efficiency of the improved filter apparatus, in cleaning the air being filtered, is extremely high, in fact, better than any known prior filters of the mechanical filtering type. This is believed to be due to the fact that, in the prior filters the fabric of the filtering medium was rather strenuously worked, either by the action of the blow rings in the reverse jet type filter, or by the "snapping" of the fabric in the reverse-flow-flushing type of filter when the air valve or damper, is suddenly opened. In the improved combination filter of the present invention, however, the filter fabric is gradually distended as the air trunk, or plenum, moves over the filter element opening, and there is no violent working or snapping of the filter medium. Thus when the shock wave occurs, although a visible spurt of dust is observed leaving the surface of the filter element, there is no movement of the fabric itself that is visible to the eye, and hence the likelihood of dust particles working their way through the interstices of the filter medium is substantially obviated.

I claim:

1. The method of removing solid particles from a particle laden gas stream which comprises passing the particle laden gas from the exterior to the interior of a closed elongate hollow filter element made of a flexible fabric material adapted to retain a substantial portion of said particles on the exterior surface thereof, intermittently passing a reverse flow of a cleaning gas through said filter element from the interior thereof at a pressure sufficient to distend the filter element to a taut condition of fabric thereof, and immediately after the filter elements are distended transmitting a shock wave from end to end of said filter element concomitant with the taut condition of the filter fabric, the filter element having an open end for the flow of gas therethrough, and the said shock wave being a traveling pressure front of supersonic velocity developed adjacent said open end of the filter element by the explosive release thereinto of air pressure from a conduit orifice directed axially into said open end, said air pressure being that of compressed air supplied to said conduit at a pressure of about 60 to 100 p.s.i.g. for a duration of about 0.15 second.

2. In a gas filtering apparatus the combination of
(a) a casing structure comprising a separating chamber having an inlet passage and a filtered gas chamber having a discharge passage,
(b) a partition in said casing to define and separate said chambers and having an outlet passageway therein for communication between said chambers,
(c) a flexible elongate gas permeable filter bag in said separating chamber having an open end surrounding said outlet passageway in sealed relation with said partition on the separating chamber side thereof, said filter bag being closed at its other end and adapted to collect solids on its outside surface from a gas flowing therethrough from said separating chamber to said filtered gas chamber through said passageway,
(d) a reverse flow means for intermittently introducing a reverse flow of cleaning gas through said outlet passageway and into said filter bag from the filtered gas chamber side of said partition to tauten the bag by distention and to flush collected solids from the outside surface thereof, and
(e) shock wave means for transmitting a shock wave axially into the distended and tautened filter bag concomitant with the reverse flow of cleaning gas therethrough said shock wave means for generating the shock wave comprising a conduit extending into said reverse flow means and across said outlet passageway and having at least one discharge orifices directed directed substantially axially into the filter bag and means for instantaneously releasing a charge of compressed air into said conduit axially and at a pressure sufficient to develop a single abrupt traveling wave front of super-sonic velocity upon release of said compressed air from said conduit orifice into the filter bag.

3. In a gas filtering apparatus the combination of
(a) a hollow casing having a transverse partition therein sealed to the surrounding wall thereof and dividing said casing into a separating chamber and a filtered gas chamber, said casing having a gas inlet passage leading into said separating chamber and a discharge passage leading from said filtered gas chamber,
(b) said partition having a plurality of spaced openings therethrough for communication between said chambers,
(c) a tubular filter element of flexible material extending into the separating chamber from each partition opening, each filter element having an open end mounted to said partition in sealed surrounding relation with the respective partition opening and being closed at its other end,
(d) a movable air supply manifold for introducing a reverse flow of cleaning gas into each filter element through its respective partition opening, said manifold being disposed in said filtered gas chamber and having a discharge aperture opening toward said partition for alignment with the partition openings individually,
(e) means for delivering a continuous supply of pressured gas to said manifold,
(f) means for moving said manifold to align its aperture with each of said partition openings successively and deliver cleaning gas thereinto whereby the respective filter element is distended to a taut condition,
(g) means in said manifold for generating a shock wave directed into the respective filter element when the filter element becomes tautened by the cleaning gas,
(h) the means for generating the shock wave comprising a conduit mounted in the manifold to extend across the discharge aperture thereof and having at least one outlet orifice directed outwardly from said discharge aperture,
(i) and means for instantaneously releasing a charge of compressed air into said conduit at a pressure sufficient to develop an abrupt single peak traveling wave front of supersonic velocity upon discharge of said compressed air from the conduit orifice.

4. A gas filtering apparatus comprising
(a) a hollow cylindrical casing having an axially transverse partition therein sealed to the surrounding sidewall and dividing the casing into a separating chamber and a filtered gas chamber, said casing having a gas inlet leading into the separating chamber and a discharge passage leading from the filtered gas chamber,
(b) said partition having a plurality of angularly spaced partition openings therethrough for communication between said chambers.
(c) an elongate tubular filter element of flexible material extending into the separating chamber from each partition opening each filter element having an open end secured to said partition in surrounding relation with a respective partition opening and being closed at its other end,
(d) a hollow air supply manifold movable angularly about the axis of said casing for introducing a reverse flow of cleaning gas into each of said filter elements and being disposed in said filtered gas chamber, said manifold having a discharge aperture opening toward the partition and adapted to register with the partition openings individually and successively as the manifold moves about the casing axis,
(e) means for moving said manifold about the casing axis and means for providing a continuous supply of pressured gas to the manifold whereby the respective filter element is distended to a taut condition by the said gas as the manifold aperture registers with each partition opening, and (f) a shock wave generator mounted within said manifold, said generator comprising
  (1) a tubular member extending across the manifold aperture and having an orifice opening outwardly from the said aperture toward the casing partition, and
  (2) means for instantaneously releasing a charge of compressed air into said closed tubular member at each occurrence of the manifold aperture becoming registered with a partition opening, said compressed air being at a pressure sufficient to develop an abrupt traveling wave front of supersonic velocity originating at the said orifice upon the release therethrough of the pressure within said tubular member.

References Cited

UNITED STATES PATENTS

| | | | |
|---|---|---|---|
| 2,468,603 | 4/1949 | Pew | 210—410 X |
| 2,804,168 | 8/1957 | Church. | |
| 2,848,112 | 8/1958 | Hass | 210—410 X |
| 2,862,622 | 12/1958 | Kircher et al. | 210—410 X |
| 2,962,120 | 11/1960 | Layarias. | |
| 2,974,748 | 3/1961 | Swanson. | |
| 3,053,031 | 9/1962 | Vedder et al. | |
| 3,064,619 | 11/1962 | Fortman. | |
| 3,073,097 | 1/1963 | Hellett et al. | |
| 3,097,936 | 7/1963 | Lincoln. | |
| 3,158,455 | 11/1964 | Lincoln. | |
| 3,178,868 | 4/1965 | Gibby. | |
| 3,212,237 | 10/1965 | Wright. | |
| 3,241,297 | 3/1966 | Hanes. | |
| 3,243,940 | 4/1966 | Larson. | |
| 3,256,679 | 6/1966 | Snyder. | |

FOREIGN PATENTS

| | | |
|---|---|---|
| 248,453 | 12/1963 | Australia. |
| 974,144 | 11/1964 | Great Britain. |
| 990,587 | 4/1965 | Great Britain. |

OTHER REFERENCES

Billings et al.: "Shock Wave Cleaning of Air Filters," Journal of the Air Pollution Control Association, vol. 10, No. 4, August 1960, p. 318.

HARRY B. THORNTON, Primary Examiner

D. E. TALBERT, Jr., Assistant Examiner

U.S. Cl. X.R.

55—283, 284, 292, 293, 294, 302, 341